United States Patent
Kawamura

(10) Patent No.: US 8,617,336 B2
(45) Date of Patent: Dec. 31, 2013

(54) METHOD FOR MOLDING CONTINUOUS FIBER PREPREG PART

(75) Inventor: Nobuya Kawamura, Nissin (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 169 days.

(21) Appl. No.: 13/005,252

(22) Filed: Jan. 12, 2011

(65) Prior Publication Data
US 2011/0186212 A1    Aug. 4, 2011

(30) Foreign Application Priority Data
Feb. 1, 2010   (JP) ................................ 2010-020334

(51) Int. Cl.
*B65H 81/00*   (2006.01)

(52) U.S. Cl.
USPC ........... 156/194; 156/161; 156/173; 156/180; 156/245

(58) Field of Classification Search
USPC ......................... 156/161, 173, 175, 189, 194
See application file for complete search history.

(56) References Cited

U.S. PATENT DOCUMENTS

| | | | | | |
|---|---|---|---|---|---|
| 3,294,887 | A | * | 12/1966 | Altermatt | 264/229 |
| 3,483,055 | A | * | 12/1969 | Eshbaugh | 156/189 |
| 4,353,267 | A | * | 10/1982 | Robert | 74/579 R |
| 4,403,525 | A | * | 9/1983 | Bongers | 74/579 E |
| 4,408,380 | A | * | 10/1983 | Schaper et al. | 29/888.09 |
| 5,578,154 | A | * | 11/1996 | Britten | 156/172 |
| 2002/0172817 | A1 | * | 11/2002 | Owens | 428/304.4 |

FOREIGN PATENT DOCUMENTS

| | | | |
|---|---|---|---|
| DE | 1504652 | | 7/1969 |
| DE | 38 05 245 | A1 | 8/1989 |
| DE | 4014549 | A1 * | 11/1990 |
| DE | 41 37 379 | A1 | 5/1993 |
| DE | 102004007313 | A1 | 9/2005 |
| DE | 10 2008 012 364 | A1 | 10/2008 |
| EP | 572752 | A1 * | 12/1993 |
| EP | 1568473 | A1 * | 8/2005 |
| FR | 2543054 | A1 * | 9/1984 |
| GB | 2 216 150 | A | 10/1989 |
| JP | 59038026 | A * | 3/1984 |
| JP | 59123622 | A * | 7/1984 |

(Continued)

OTHER PUBLICATIONS

Machine translation of Krause (EP-1568473A1), Nov. 2004, 9 pages.*

(Continued)

*Primary Examiner* — William Bell
(74) *Attorney, Agent, or Firm* — Sughrue Mion, PLLC

(57) ABSTRACT

This invention provides a method for molding a continuous fiber prepreg part whereby a continuous fiber prepreg part comprising thermoplastic prepreg tape can be molded in a shape that allows the exhibition of desired physical properties without the sacrifice of productivity.

Prepreg tape 11 is wound around a plurality of rods 21 so as to form a rolled continuous fiber prepreg part 12, slack is removed from the prepreg tape 11 by shifting the plurality of rods 21 in opposite directions so as to generate tension in the continuous fiber prepreg part 12, the continuous fiber prepreg part 12 is pressed with a press jig 41 so as to mold the prepreg part into the final shape, and the continuous fiber prepreg part 12 is cured by heating and cooling after heating.

2 Claims, 8 Drawing Sheets

(56) References Cited

FOREIGN PATENT DOCUMENTS

| | | | |
|---|---|---|---|
| JP | 63023019 A | * | 1/1988 |
| JP | 63-270931 A | | 11/1988 |
| JP | 64-82920 A | | 3/1989 |
| JP | 8-174701 A | | 7/1996 |
| WO | 93/09932 A1 | | 5/1993 |
| WO | 2008/116438 A1 | | 10/2008 |

OTHER PUBLICATIONS

German Office Action dated May 7, 2012, issued in corresponding German Application No. 10 2011 000 105.0.

* cited by examiner (a)

(b)

METHOD FOR MOLDING CONTINUOUS FIBER PREPREG PART

BACKGROUND OF THE INVENTION

1. Field of the Invention

The present invention relates to a method for molding a continuous fiber prepreg part comprising prepreg tape comprises a plurality of unidirectional continuous fibers that are aligned to form tape and impregnated with a thermoplastic resin.

2. Background Art

A known method for producing a fiber-reinforced plastic (FRP) part is a filament winding process for producing a continuous fiber prepreg part, which comprises obtaining prepreg tape by impregnating continuous fibers in a tape form with an unreacted resin solution that serves as a matrix resin and winding the prepreg tape around a mandrel by applying tension.

Thermosetting prepreg tape is characterized by low viscosity, uniform softness, and the property of being easily shaped, compared with thermoplastic prepreg tape. When thermosetting prepreg tape is used in a filament winding process, tension can be readily applied to fibers. This is essential for the exhibition of physical properties of continuous fibers.

Patent Document 1 describes a technique for subjecting a prepreg to molding in a simple shape, curing the prepreg, and then carrying out secondary processing after curing, and processing the prepreg into a complex three-dimensional shape.

SUMMARY OF THE INVENTION

Despite the aforementioned, thermoplastic prepreg tape has higher viscosity and rigidity than thermosetting prepreg tape. Therefore, the use of thermoplastic prepreg tape in a filament winding process makes it difficult to apply tension that is essential for the exhibition of physical properties of continuous fibers. In such case, it is impossible to form the tape in a complex shape starting at the beginning of processing. If the tape is processed in a complex shape after winding, the obtained prepreg tape might become slack or wrinkled, which is problematic. In the case of a continuous fiber prepreg part consisting of slack or wrinkled prepreg tape, void formation or fiber meandering takes place. If such prepreg part is cured as is to obtain a fiber-reinforced resin part, it is impossible for desired physical properties to be exhibited.

In addition, when a matrix resin is cured and then subjected to secondary processing so as to deform the resin into a complex three-dimensional shape as described in JP Patent Publication (Kokai) No. 63-270931 A (1988), the fiber circumferential length of a laminate layer section varies depending on fiber section. This might cause fiber meandering inside a continuous fiber prepreg, which is problematic. In addition, secondary processing is inappropriate for mass-production because of low productivity.

The present invention has been made in view of the above. The object of the present invention is to provide a method for molding a continuous fiber prepreg part whereby a continuous fiber prepreg part comprising thermoplastic prepreg tape can be molded in a shape that allows the exhibition of desired physical properties without the sacrifice of productivity.

The continuous fiber prepreg part molding method of the present invention whereby the above object is attained is a method for molding a continuous fiber prepreg part comprising prepreg tape consisting of a plurality of unidirectional continuous fibers that are aligned to form tape and impregnated with a thermoplastic resin, which comprises: a winding step for winding prepreg tape around a plurality of rods so as to form a rolled continuous fiber prepreg part; a slack-removing step for removing slack from the prepreg tape by shifting the plurality of rods in opposite directions so as to generate tension in the continuous fiber prepreg part; a molding step for pressing the continuous fiber prepreg part with a press jig so as to mold the prepreg part into the final shape; and a curing step for curing the continuous fiber prepreg part by heating and cooling after heating.

According to the continuous fiber prepreg part molding method of the present invention, prepreg tape slack is removed by generating tension in a rolled continuous fiber prepreg part and then the prepreg part is pressed by a press jig so as to mold the prepreg part into the final shape. Therefore, void formation and fiber meandering in the continuous fiber prepreg part can be prevented. In addition, each step can be carried out during assembly line production. Therefore, the method is excellent in terms of productivity, facilitating mass-production. Accordingly, the continuous fiber prepreg part can be formed in a shape that allows the exhibition of desired physical properties without the sacrifice of productivity.

The continuous fiber prepreg part molding method of the present invention is characterized in that a continuous fiber prepreg part is partially welded in the prepreg tape lamination direction for temporary fixation in the molding step.

According to the continuous fiber prepreg part molding method of the present invention, partial welding in the prepreg tape lamination direction is carried out for temporary fixation. Therefore, the final shape of the continuous fiber prepreg part can be maintained such that deformation of the continuous fiber prepreg part shape can be prevented. This facilitates handling of the continuous fiber prepreg part, resulting in improved productivity.

The continuous fiber prepreg part molding method of the present invention is characterized in that a temporarily fixed continuous fiber prepreg part is set within an injection die of an injection molding apparatus, injection molding is carried out, and the continuous fiber prepreg part is heated with the use of the heat of the molten material injected into the injection die during injection molding in the curing step.

According to the continuous fiber prepreg part molding method of the present invention, a continuous fiber prepreg part is heated with the heat of the molten material injected into the injection die during injection molding. Therefore, a fiber-reinforced resin part can be obtained after curing by cooling. At the same time, an injection molding product comprising the fiber-reinforced resin part as a skeletal member can be produced. Accordingly, the number of steps can be reduced, resulting in productivity improvement and cost reduction.

According to the continuous fiber prepreg part molding method of the present invention, tension is generated in a rolled continuous fiber prepreg part so as to remove prepreg tape slack. Then, the prepreg part is pressed by a press jig so as to mold the prepreg part into the final shape. Accordingly, void formation and fiber meandering in the continuous fiber prepreg part can be prevented. In addition, each step can be carried out during assembly line production. Therefore, the method is excellent in terms of productivity, facilitating mass-production. Consequently, the prepreg part can be formed in a shape that allows exhibition of desired physical properties without the sacrifice of productivity.

EMBODIMENTS OF THE INVENTION

Next, embodiments of the present invention are described below with reference to the drawings.

Specific Embodiment 1

FIGS. 1 to 4 each illustrate Specific Embodiment 1 of the continuous fiber prepreg part molding method used in this Embodiment. FIG. 1(a) schematically shows prepreg tape. FIG. 1(b) is a perspective view conceptually illustrating a prepreg tape winding method. FIG. 1(c) is a plain view of FIG. 1(b).

The continuous fiber prepreg part molding method of Specific Embodiment 1 comprises a winding step, a slack-removing step, a shaping step, and a curing step. In the winding step, an operation of winding thermoplastic prepreg tape 11 around two rods 21 so as to form a rolled continuous fiber prepreg part 12 is carried out.

As shown in FIG. 1(a), a prepreg tape 11 is composed of a plurality of unidirectional continuous fibers that are aligned to form tape and impregnated with a thermoplastic resin solution that serves as a matrix resin. Examples of unidirectional continuous fibers include carbon fibers, glass fibers, and aramid fibers. Examples of thermoplastic resin include polyethylene, polypropylene, and polyamide.

As shown in FIGS. 1(b) and 1(c), prepreg tape 11 is loosely wound around two rods 21 such that a rolled continuous fiber prepreg part 12 having an elliptic shape from a top face view is formed.

Figure 5:
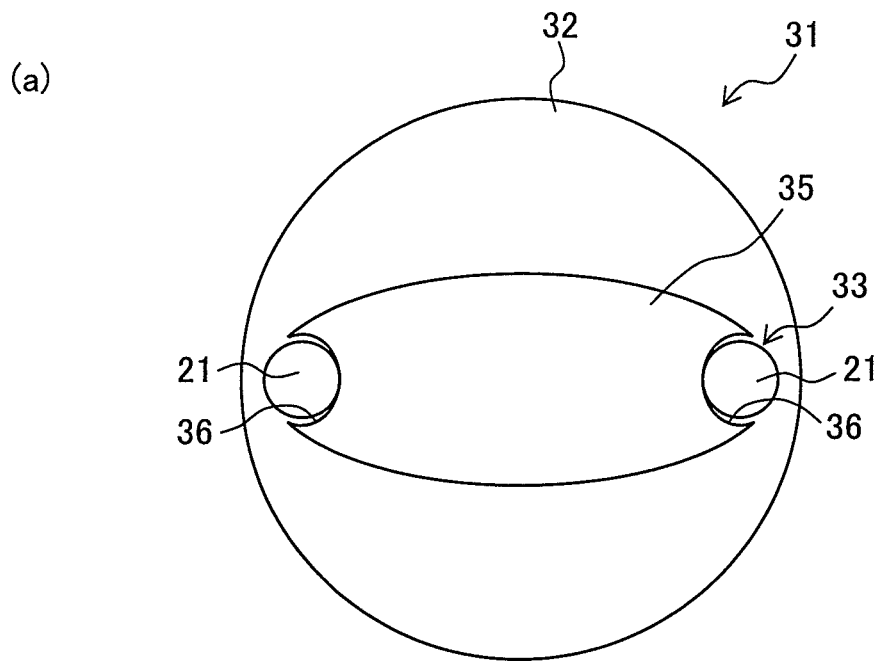
FIG. 5 illustrates a configuration of a prepreg tape winding apparatus.
Figure 5:
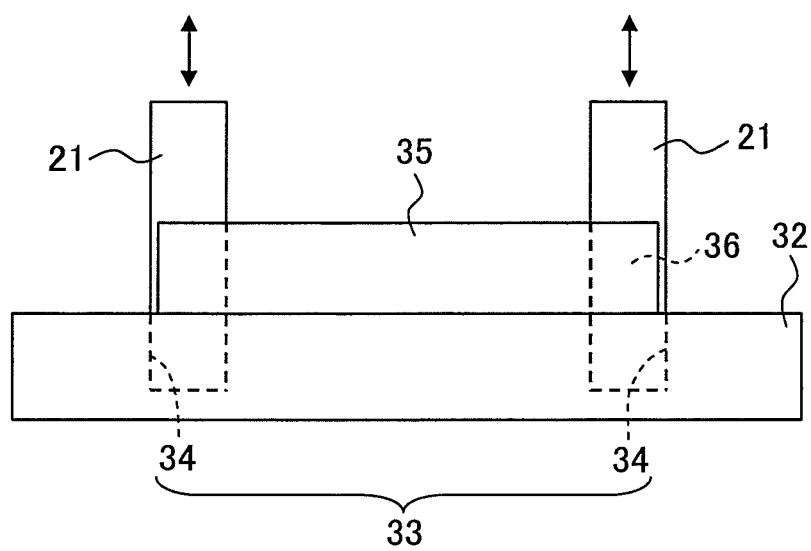

FIG. 5 illustrates the configuration of a prepreg tape winding apparatus.

Figure 6:
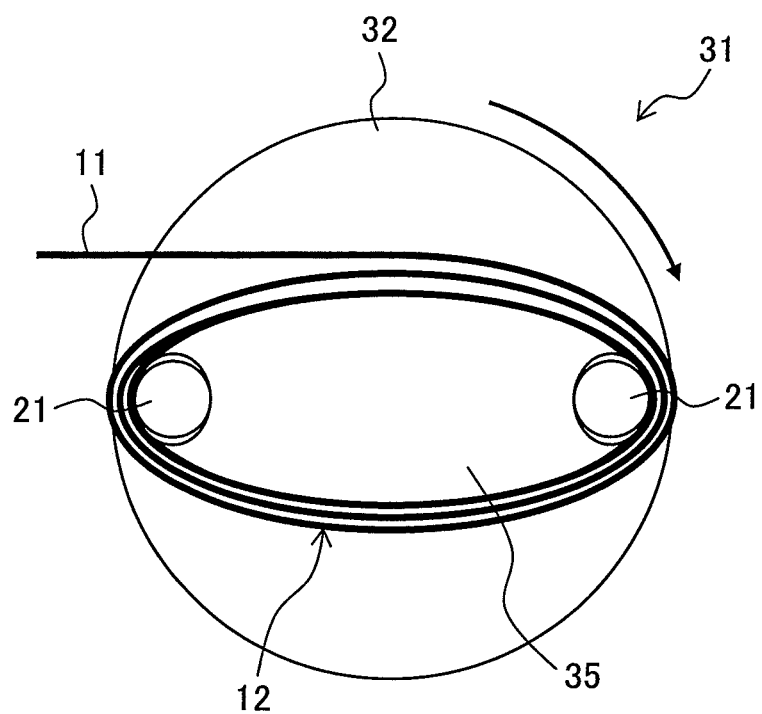
FIG. 6 illustrates a winding method using the winding apparatus shown in FIG. 5.

FIG. 6 illustrates a winding method using the winding apparatus.

A winding apparatus 31 is used to wind prepreg tape 11 around two rods 21 so as to form a continuous fiber prepreg part 12. As shown in the plain view of FIG. 5(a) and the front view of FIG. 5(b), the apparatus has: a disk-like rotary table 32 that is unidirectionally driven by rotation with a drive means such as a motor; a holding means 33 that holds the rods 21 on the rotary table 32 in a removable manner; and a cored bar portion 35 in an approximately elliptic cylindrical shape that protrudes from the top face of the rotary table 32 and is rotated with the rotary table 32.

As shown in FIG. 5(b), the holding means 33 has a pair of holes 34 opening onto the top face of the rotary table 32. The holes 34 are formed at separate sites that are equally distant (radially outward) from the rotation center of the rotary table 32. In such configuration, the rods 21 can be held parallel to each other by inserting the end portions of the rods 21 into the holes.

Each rod 21 has a round bar shape with a given diameter. In addition, it has an axial direction length so that it can protrude to a given height from the rotary table 32 when it is held by the holding means 33. The cored bar portion 35 is formed on the rotary table 32 such that the semimajor axis thereof is positioned between the two rods 21. In addition, a concave groove portion 36 having an arcuate section is formed on both ends of the semimajor axis of the cored bar portion 35 along the height direction of the cored bar portion 35. When one end portion of a rod 21 is inserted into a hole 34 and held therein, the rod 21 is inserted through a concave groove portion 36. As shown in FIG. 5(b), a part of the outer surface of a rod 21 is allowed to radially protrude outward from each end portion of the semimajor axis of the cored bar portion 35.

In order to wind prepreg tape 11 with the use of a winding apparatus 31 having the above configuration, a holding means 33 is used to hold two rods 21, one end of prepreg tape 11 is fixed to a rod 21, and high-speed winding is carried out by rotating a rotary table 32. Thus, as shown in FIG. 6, prepreg tape 11 is wound around a cored bar portion 35 so that a rolled continuous fiber prepreg part 12 having an elliptic shape from a top face view is formed. Then, a continuous fiber prepreg part 12 is removed together with the two rods 21 from the cored bar portion 35.

Figure 1:
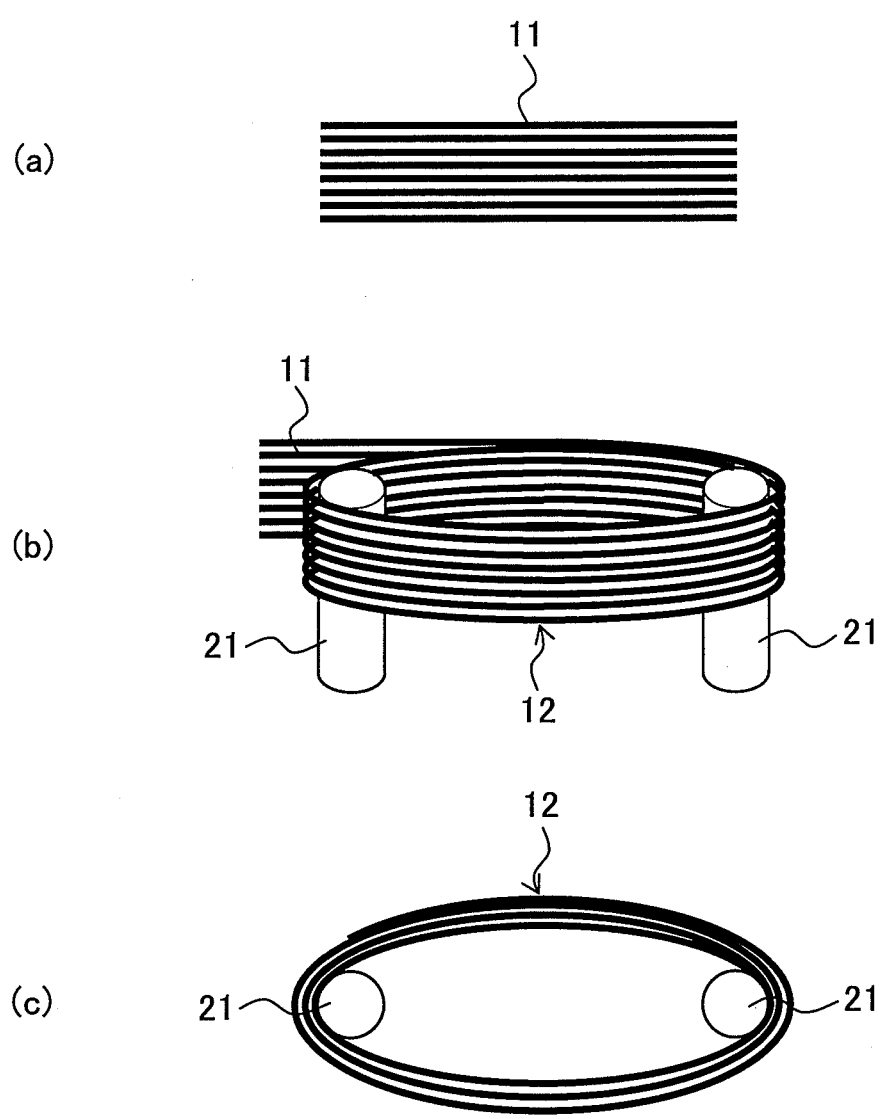
FIG. 1 illustrates Specific Embodiment 1 of the continuous fiber prepreg part molding method.
Figure 2:
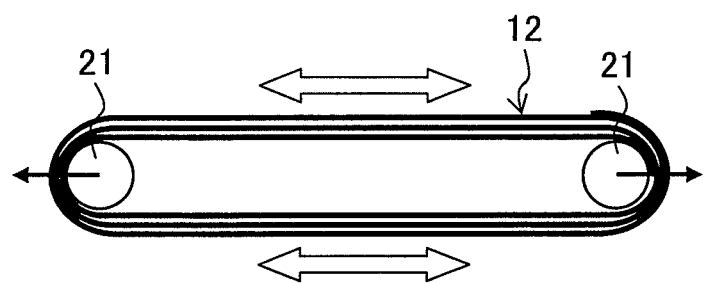
FIG. 2 illustrates Specific Embodiment 1 of the continuous fiber prepreg part molding method.

Next, in the slack-removing step, as shown in FIG. 2, an operation of removing slack from prepreg tape 11 by shifting the two rods 21 in opposite directions so as to generate tension in the continuous fiber prepreg part 12 is carried out.

As a result of the positional shifting of the two rods 21, the elliptic shape of the continuous fiber prepreg part 12 shown in FIG. 1(c) is deformed into a track shape as shown in FIG. 2; that is to say, a shape consisting of two semi-arcs connected to each other with a pair of parallel line segments. In such case, uniform tension is generated around the entire circumference of the continuous fiber prepreg part 12 along the fiber direction.

The prepreg tape 11 has low adherence because it is made from a thermoplastic resin. Therefore, if it is simply wound, laminated portions are relatively likely to be dislocated, facilitating slack generation or wrinkle formation. Accordingly, voids, or spaces inside a prepreg, are likely to be formed or fiber meandering representing continuous fiber orientation disturbance is likely to be caused. This might result in less desirable physical properties.

In order to cope with the above problem, in the slack-removing step, an operation of removing slack from prepreg tape 11 by generating tension around the entire circumference of the continuous fiber prepreg part 12 is carried out. This operation allows laminated portions of the prepreg tape 11 to closely come into contact with each other. Thus, void formation between laminated layers of the continuous fiber prepreg part 12 can be prevented.

In addition, the continuous fiber orientation in the prepreg tape 11 can be improved. Thus, generation of fiber meandering inside the continuous fiber prepreg part 12 can be prevented. Here, in Specific Embodiment 1, an example in which two rods 21 are used is described. However, the number of rods 21 is not limited to two as long as a continuous fiber prepreg part can be shifted in a direction such that slack can be removed from prepreg tape 11. Further, an example in which a rod 21 having a round bar shape is used is described. However, a rod 21 may have a different shape as long as a continuous fiber prepreg part can be shifted in a direction such that slack can be removed from prepreg tape 11.

Figure 3:
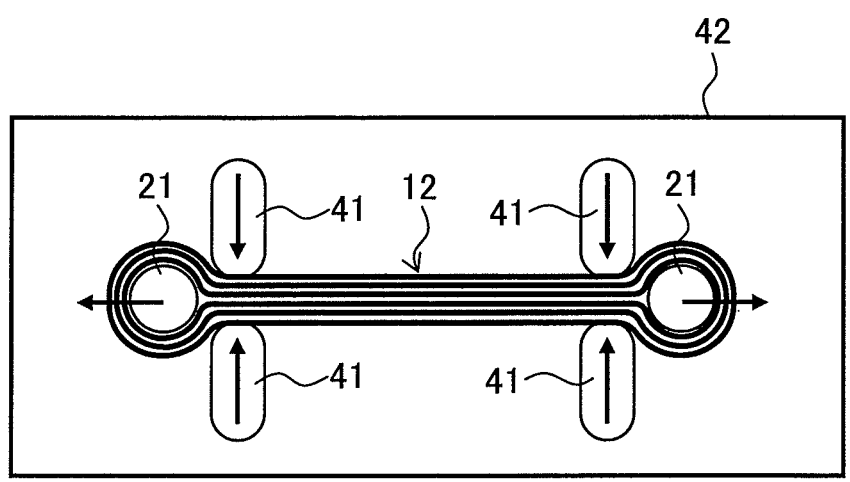
FIG. 3 illustrates Specific Embodiment 1 of the continuous fiber prepreg part molding method.
Figure 4:
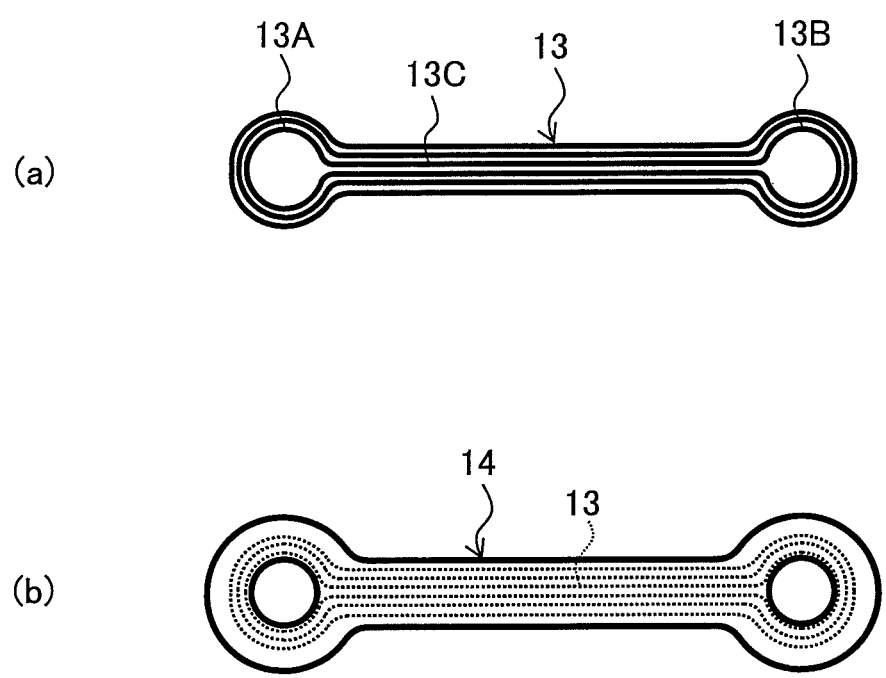
FIG. 4 illustrates Specific Embodiment 1 of the continuous fiber prepreg part molding method.

Then, in the molding step, an operation of molding a continuous fiber prepreg part 12 into the final shape by pressing it with a press jig 41 is carried out as shown in FIG. 3. A press jig 41 presses and shifts a pair of parallel line segment portions of the continuous fiber prepreg part 12 in a direction that allows the portions to become closer to each other. Regarding the continuous fiber prepreg part 12, line segment portions wound around two rods 21 are at least partially pressed and shifted by a press jig 41, provided that the two rods 21 are located in opposite directions. Accordingly, the continuous fiber prepreg part 12 can be molded in the final shape without causing void formation or fiber meandering.

Here, in Specific Embodiment 1, the present invention is explained with reference to an example in which line segment portions of a continuous fiber prepreg part 12 are pressed and shifted by a press jig 41 in a direction that allows the portions to become closer to each other. However, a press jig 41 may be a means that can partially press and shift a continuous fiber prepreg part 12 while generating tension around the entire circumference of the continuous fiber prepreg part 12. For instance, it may press and shift a pair of line segment portions in opposite directions or in the same direction.

In addition, in the curing step, an operation of heating a continuous fiber prepreg part 12 and cooling it after heating for curing is carried out. As shown in FIG. 3, two rods 21 of a continuous fiber prepreg part 12 are located in opposite directions and the prepreg part is pressed by a press jig 41 so as to mold the prepreg part into the final shape. A continuous fiber prepreg part 12 in such state is introduced into a heating furnace 42, followed by heating at a given temperature for a given period of time and then cooling for curing.

Therefore, as shown in FIG. 4(a), a fiber-reinforced resin part 13 in the final shape consisting of a pair of arcuate end portions 13A and 13B and a line segment portion 13C that connects the arcuate end portions 13A and 13B can be obtained. The fiber-reinforced resin part 13 produced by the above steps experiences neither void formation nor fiber meandering and thus can exhibit desired physical properties. In the continuous fiber prepreg part molding method described above, each step can be carried out during assembly line production. Therefore, the method is excellent in terms of productivity, facilitating mass-production. Consequently, a continuous fiber prepreg part can be formed in a shape that allows exhibition of desired physical properties without the sacrifice of productivity.

Here, the fiber-reinforced resin part 13 can be used as a skeletal member of an injection molding product such as a suspension arm 14 made of a synthetic resin, for example. When a fiber-reinforced resin part 13 is used as a skeletal member of the suspension arm 14, the fiber-reinforced resin part 13 is placed inside an injection die of an injection molding machine for injection molding. Then, a synthetic resin is made to surround a fiber-reinforced resin part 13 for shaping. Therefore, as shown in FIG. 4(b), a suspension arm 14 made of a synthetic resin comprising a skeletal member consisting of a fiber-reinforced resin part 13 can be produced.

Specific Embodiment 2

Figure 7:
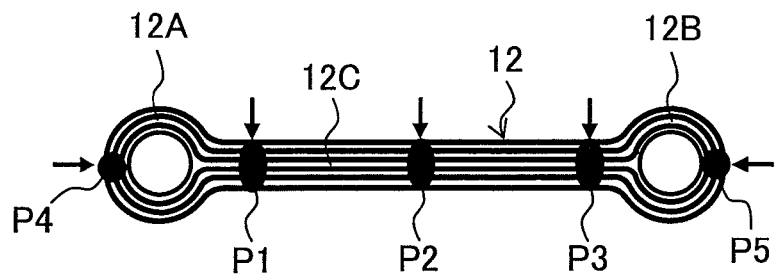
FIG. 7 illustrates Specific Embodiment 2 of the continuous fiber prepreg part molding method.
Figure 8:
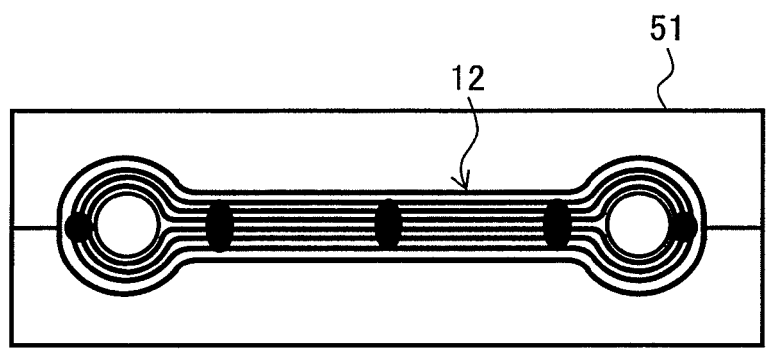
FIG. 8 illustrates Specific Embodiment 2 of the continuous fiber prepreg part molding method.
Figure 9:
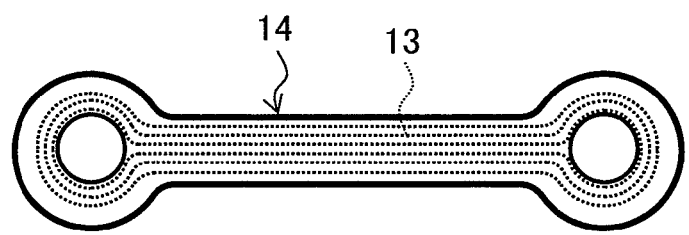
FIG. 9 illustrates Specific Embodiment 2 of the continuous fiber prepreg part molding method.

FIGS. 7 to 9 illustrate Specific Embodiment 2 of the continuous fiber prepreg part molding method. In Specific Embodiment 2, the method is characterized in that a continuous fiber prepreg part 12 is molded in the final shape in the molding step and then the continuous fiber prepreg part 12 is partially welded in the direction of lamination of prepreg tape 11 for temporary fixation, and in that the temporarily fixed continuous fiber prepreg part 12 is set within an injection die 51 of an injection molding apparatus for injection molding in the curing step. Here, for the winding step and the slack-removing step, detailed explanation is omitted because each step is carried out in the manner described in Specific Embodiment 1.

In the molding step, the continuous fiber prepreg part 12 is molded in the final shape. Then, an operation of partially welding the continuous fiber prepreg part 12 in the direction of lamination of prepreg tape 11 for temporary fixation is carried out. Welding is carried out to an extent such that mutually laminated pieces of prepreg tape 11 can be prevented from coming loose from each other while a certain level of misalignment is accepted.

Therefore, the final shape of the continuous fiber prepreg part 12 can be maintained, facilitating handling of the continuous fiber prepreg part 12. As a result, productivity can be improved. In Specific Embodiment 2, as shown in FIG. 7, three line segment portions 12C (P1 to P3) of the continuous fiber prepreg part 12 and two arcuate end portions 12A and 12B (P4 and P5) (5 portions in total) were welded via ultrasonic welding for temporary fixation.

In the curing step, as shown in FIG. 8, an operation of setting the continuous fiber prepreg part 12 (temporarily fixed in the molding step) within an injection die 51 of an injection molding apparatus for injection molding is carried out. For injection molding, a highly heated synthetic resin in a molten state is injected into the injection die 51 such that the continuous fiber prepreg part 12 is covered with the synthetic resin.

Accordingly, the continuous fiber prepreg part 12 can be heated with the heat of the synthetic resin (molten material) that is injected into the injection die upon injection molding. As a result, a fiber-reinforced resin member 13 can be obtained after cooling curing. At the same time, as shown in FIG. 9, a synthetic-resin-made suspension arm 14, which is an injection molding product comprising a skeletal member consisting of a fiber-reinforced resin part 13, can be produced.

As described above, according to the method of Specific Embodiment 2 shown in FIGS. 7 to 9, a continuous fiber prepreg part 12 is subjected to heat curing, and at the same time, a suspension arm 14, which is an injection molding product, can be obtained. As a result of reduction of the number of steps, productivity can be improved, allowing cost reduction.

Here, in Specific Embodiment 2 described above, the present invention is explained with reference to an example in which the temporarily fixed continuous fiber prepreg part is set within the injection molding die of the injection molding apparatus for injection molding. However, it is also possible to subject the temporarily fixed continuous fiber prepreg part to hot pressing for pressure bonding between laminated layers of the continuous fiber prepreg part and then set the resultant within the injection die for injection molding.

Figure 10:
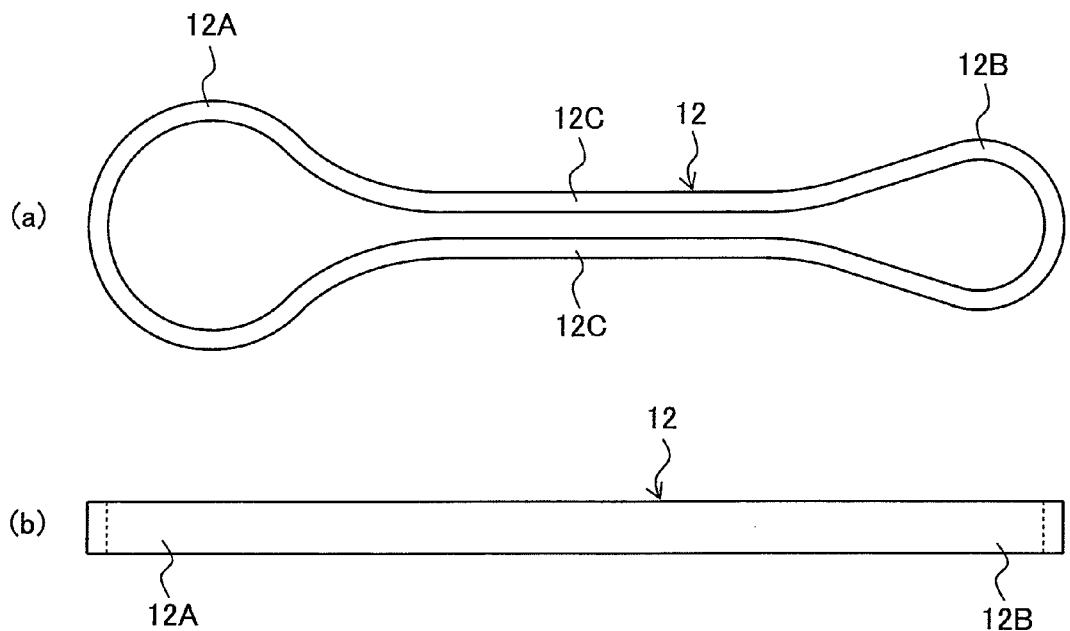
FIG. 10 illustrates an example of a fiber-reinforced resin part molded by the continuous fiber prepreg part molding method of the present invention.
Figure 11:
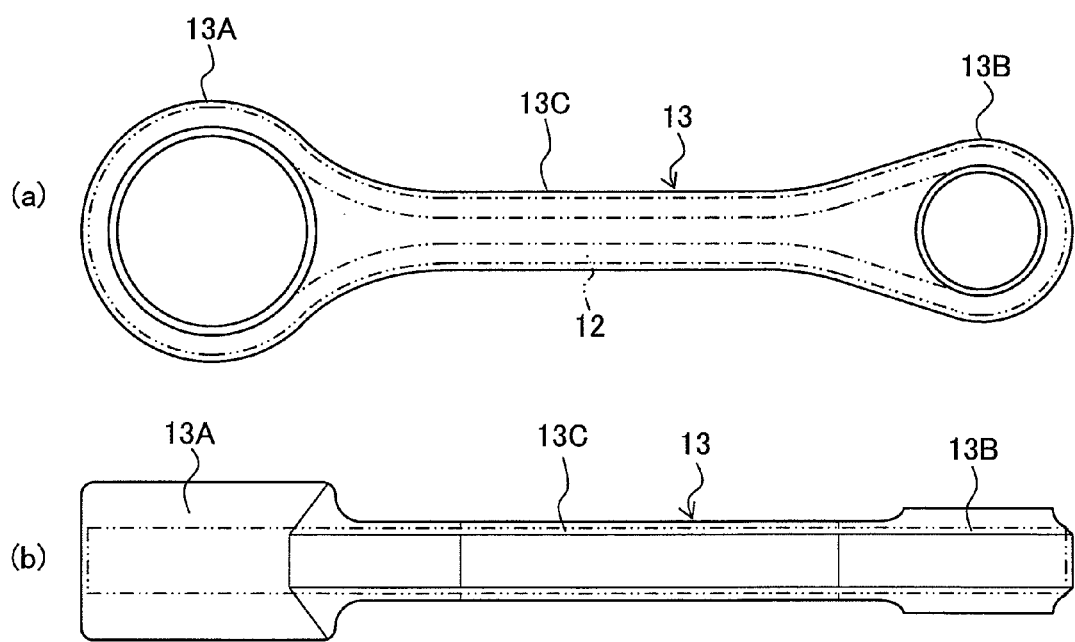
FIG. 11 illustrates an injection molding product comprising the fiber-reinforced resin part shown in FIG. 10.

The present invention is not limited to Specific Embodiments described above. Various changes and modifications to the present invention can be made without departing from the spirit or scope thereof. For instance, in Specific Embodiment 2, the present invention is explained with reference to an example in which line segment portions 12C of a continuous fiber prepreg part 12 wound around two rods 21 are pressed by a press jig 41 in a direction that allows the portions to become closer to each other so as to make the portions abut. However, it is not always necessary to make them abut. For example, as shown in FIGS. 10 and 11, they may be positioned apart from with each other with a certain gap therebetween. FIG. 10 shows an example of a continuous fiber prepreg part subjected to temporary fixation following molding into the final shape in the molding step. FIG. 11 shows an example of an injection molding product comprising the continuous fiber prepreg part shown in FIGS. 10(a) and 10(b). FIGS. 10(a) and 10(b) or FIGS. 11(a) and 11(b) correspond to a plain view and a front view of the product, respectively.

Figure 12:
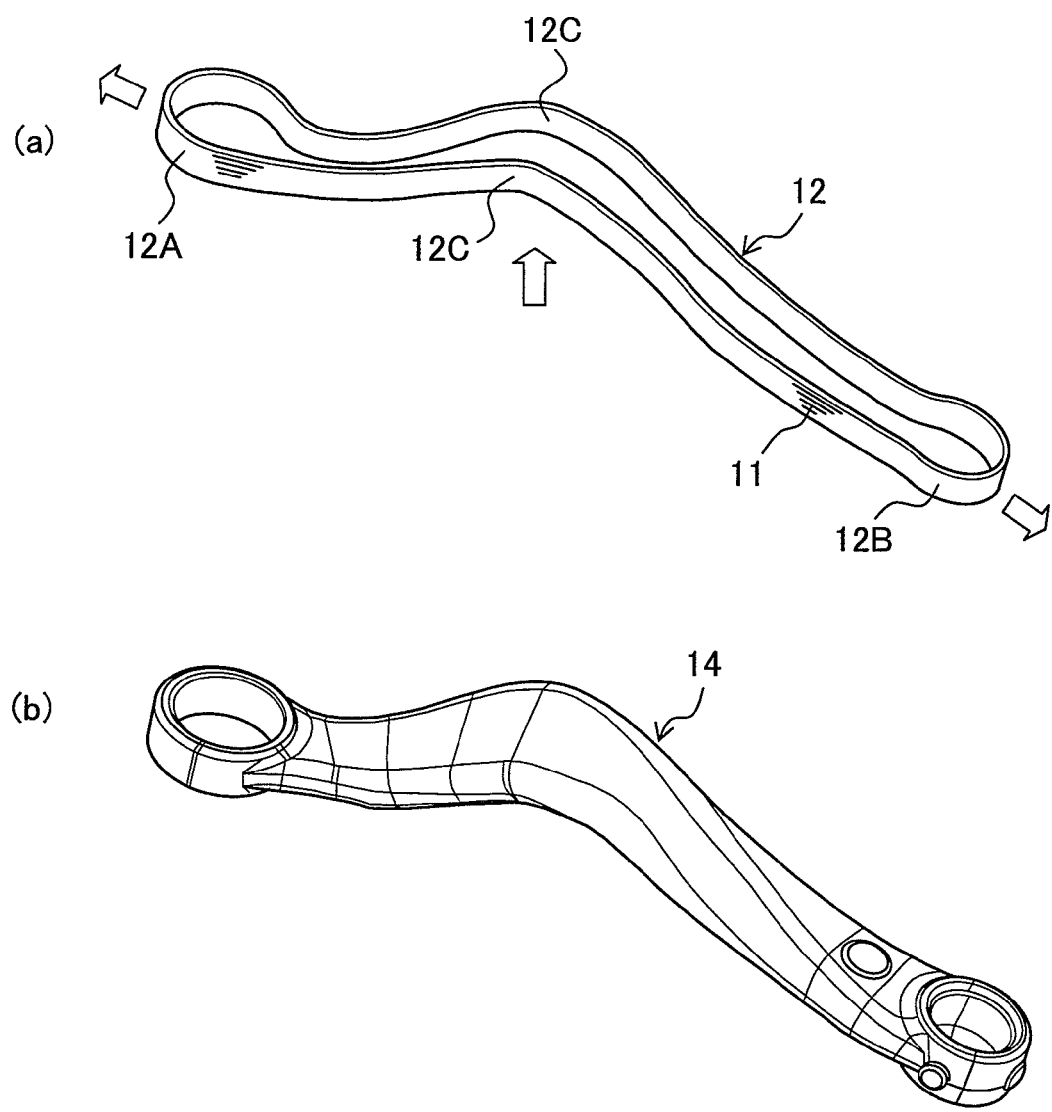
FIG. 12 illustrates a fiber-reinforced resin part molded by the continuous fiber prepreg part molding method of the present invention and an injection molding product comprising the fiber-reinforced resin part.

In addition, in the above embodiments, the present invention is explained with reference to an example in which two rods 21 are shifted in opposite directions and line segment portions 12C of a continuous fiber prepreg part 12 wound around the two rods 21 are pressed and shifted by a press jig in a direction that allows the portions to become closer to each other. However, the movement of two rods 21 and of a press jig 41 is not limited to two-dimensional planer movement and such movement may be three-dimensional movement. For example, as shown in FIG. 12, the final shape can be formed by pressing the longitudinal center portion of the continuous fiber prepreg part 12 in the width direction of the prepreg tape 11 so as to change the position of the longitudinal center portion. FIG. 12(a) shows a continuous fiber prepreg part molded in the final shape by the continuous fiber prepreg part molding method of the present invention. FIG. 12(b) shows a specific embodiment of an injection molding product comprising the continuous fiber prepreg part.

EXPLANATION OF REFERENCE NUMERALS

11: Prepreg tape
12: Continuous fiber prepreg part
13: Fiber-reinforced resin part
14: Injection molding product
21: Rod
31: Winding apparatus
41: Press jig

What is claimed is:

1. A method for molding a continuous fiber prepreg part comprising prepreg tape comprising a plurality of unidirectional continuous fibers that are aligned to form tape and impregnated with a thermoplastic resin, the method comprising:
   a winding step of winding prepreg tape around a plurality of rods so as to form a rolled continuous fiber prepreg part;
   a slack-removing step of removing slack from the prepreg tape by shifting the plurality of rods in opposite directions so as to generate tension in the continuous fiber prepreg part;
   a molding step of pressing the continuous fiber prepreg part with a press jig so as to mold the prepreg part into the final shape; and
   a curing step of curing the continuous fiber prepreg part by heating and cooling after heating,
   wherein in the winding step, a cored bar portion is placed in an area defined by the plurality of rods such that a semi-arc is formed between any two neighboring rods, the prepreg tape is wound around the rods and the cored bar portion, and the cored bar portion is removed from the area after winding of the prepreg tape,
   wherein in the molding step, the continuous fiber prepreg part is partially welded in the lamination direction of the prepreg tape via ultrasonic welding for temporary fixation.

2. The method for molding a continuous fiber prepreg part according to claim 1, wherein a temporarily fixed continuous fiber prepreg part is set within an injection die of an injection molding apparatus, injection molding is carried out, and the continuous fiber prepreg part is heated with the use of the heat of the molten material injected into the injection die during injection molding in the curing step.

* * * * *